Jan. 29, 1952 W. D. FINGER 2,584,006
TRAY HOLDER FOR AUTOMOBILES
Filed Sept. 6, 1950 2 SHEETS—SHEET 1
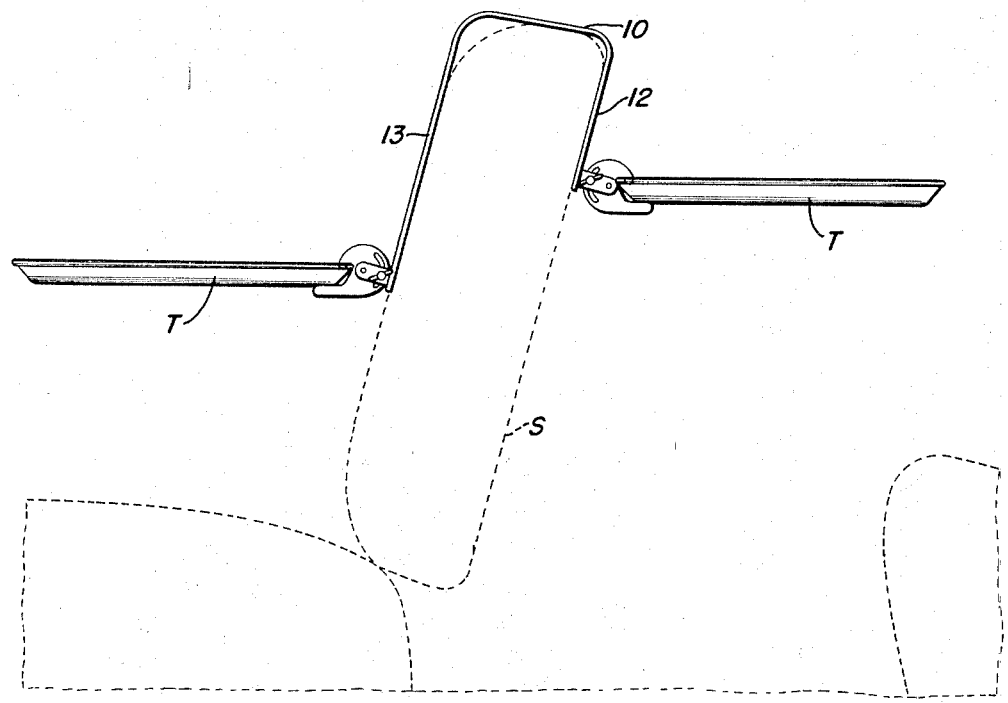
FIG. 1.
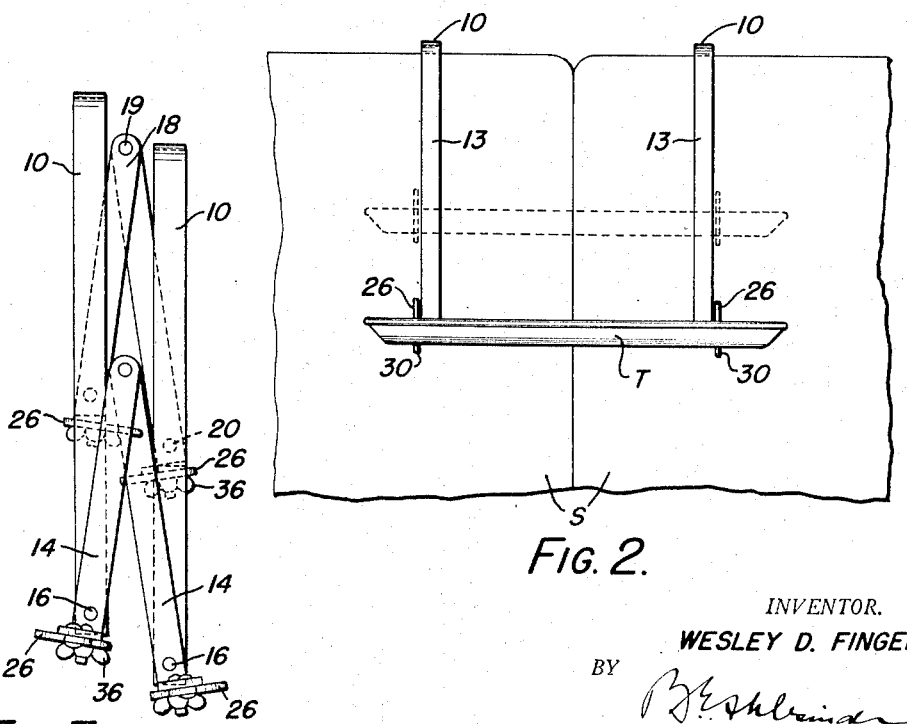
FIG. 2.
FIG. 7.
INVENTOR.
WESLEY D. FINGER
BY
ATTORNEY Jan. 29, 1952 W. D. FINGER 2,584,006
TRAY HOLDER FOR AUTOMOBILES
Filed Sept. 6, 1950 2 SHEETS—SHEET 2
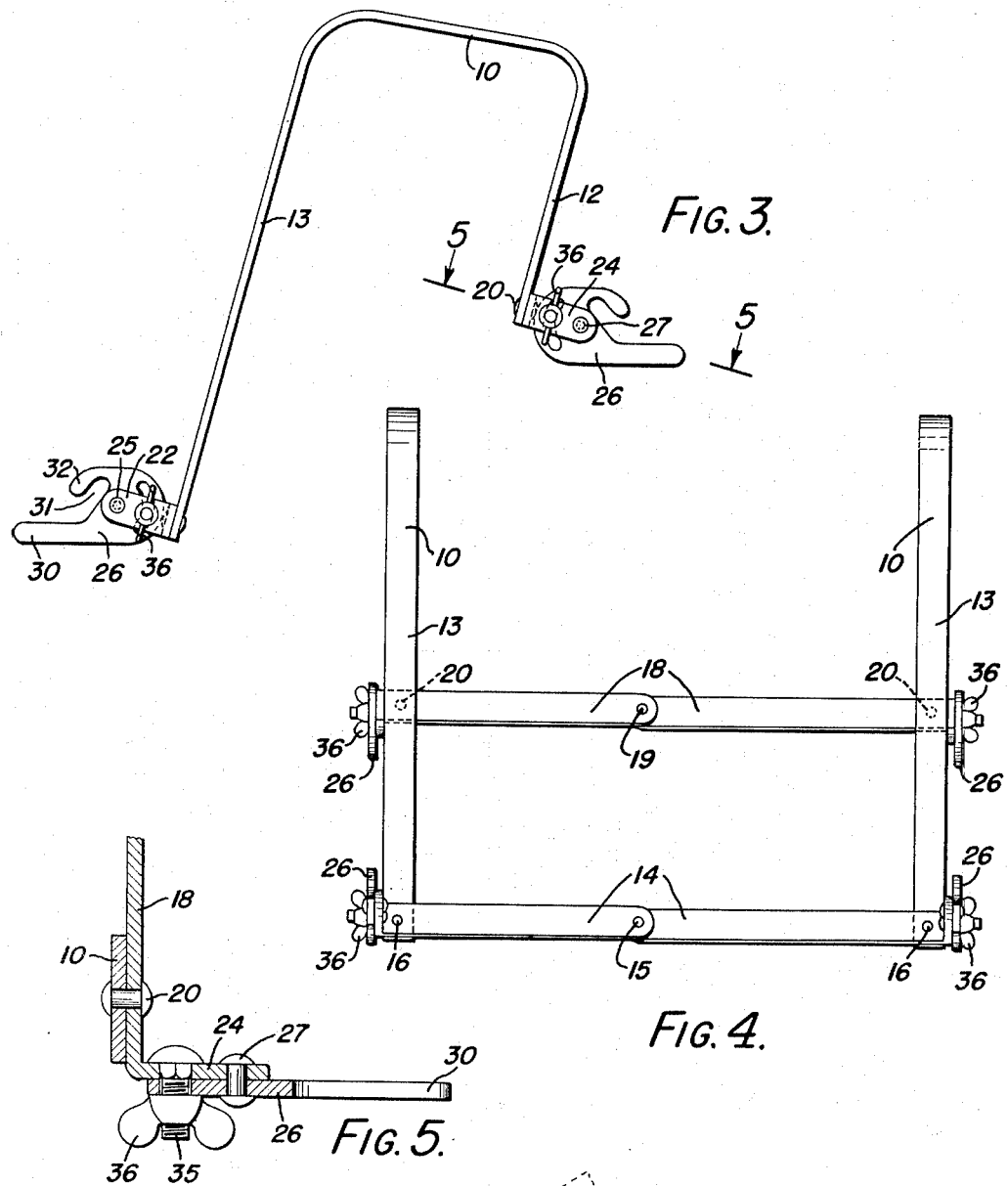
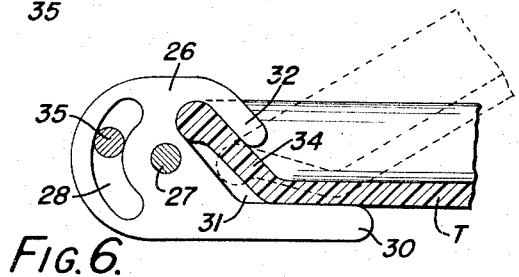
INVENTOR.
WESLEY D. FINGER
BY
ATTORNEY Patented Jan. 29, 1952

2,584,006

UNITED STATES PATENT OFFICE 2,584,006

TRAY HOLDER FOR AUTOMOBILES

Wesley D. Finger, Rochester, N. Y.

Application September 6, 1950, Serial No. 183,420

5 Claims. (Cl. 211—86)

The present invention relates to portable racks or frames especially adapted for supporting refreshment trays from the seats of automobiles or other vehicles.

One object of the invention is to provide a rack or support for refreshment trays which can easily and quickly be applied to or removed from the front seat of an automobile and which will support a tray containing refreshments without liability of spilling the refreshments.

Another object of the invention is to provide a rack or support for holding refreshment trays which may be mounted on the front seat of an automobile seat and which will simultaneously support two trays, one at the front and the other at the back of the seat so as to accommodate simultaneously persons sitting in both the front and rear seats of the automobile.

Another object of the invention is to provide a removable rack or support for holding refreshment trays in an automobile which is provided with a leveling adjustment that may be made quickly so as to insure supporting the trays in horizontal position regardless of the incline of the automobile itself.

Another object of the invention is to provide a rack or support of the character described which may readily be used not only in an automobile but at a roadside snack bar or the like.

Another object of the invention is to provide a rack or support of the character described which may readily be folded into compact form for storage when it is not in use.

Still another object of the invention is to provide a rack or support of the character described which is simple in construction and can be made at a sufficiently low cost to justify an automobilist owning the same and maintaining it as part of the equipment of his car.

Other objects of the invention will be apparent hereinafter from the specification and from the recital of the appended claims.

In the drawings:

Fig. 1 is a side elevation showing a rack or support made according to one embodiment of this invention mounted on the front seat of an automobile and supporting two refreshment trays, one at the front and the other at the back of the seat;

Fig. 2 is a view looking at the front of the automobile seat and showing the rack or support in front elevation;

Fig. 3 is a side elevation of the rack or support on an enlarged scale;

Fig. 4 is a front elevation of the rack or support of this scale;

Fig. 5 is a section on a still further enlarged scale taken on the line 5—5 of Fig. 3, looking in the direction of the arrows, and showing one of the tray-gripping jaws and the manner in which this gripping jaw is secured to the rack;

Fig. 6 is a fragmentary view at right angles to Fig. 5 showing the manner in which the gripping jaw holds the tray and how the tray may be inserted or removed from the gripping jaw; and Fig. 7 is a side elevation of the rack or support in folded position.

The rack or support comprises a pair of spaced parallel U-shaped straps 10 that are adapted to fit over the front seat or seats S of an automobile. The rear legs 12 of the straps are shorter than the front legs 13. The front legs 13 of the straps are pivotally connected at their lower ends by means of rivet pins 16 to the outer ends of a pair of links 14; and these two links 14 are pivotally connected together at their inner ends by means of a rivet-pin 15. Similarly, the rear legs 12 of the straps are connected at their lower ends by rivet-pins 20 to the outer ends of a pair of links 18; and these links 18 are pivotally connected together at their inner ends by means of a rivet-pin 19.

Each of the links 14 has a portion 22 at its outer end that is bent at right angles and extends forwardly. Similarly each of the links 18 has a portion 24 at its outer end that is bent at right angles and extends rearwardly. Upon each of the forwardly projecting portions 22 of the links 14 there is pivotally mounted by means of a rivet-pin 25 a jaw member 26. To each of the rearwardly projecting portions 24 of the link member 18 there is also pivotally mounted a jaw member 26 by means of a rivet-pin 27.

The jaw members 26 are shaped as shown in Fig. 6. Each has an arcuate slot 28 cut through it at one side of the pivot pin 25 or 27; each has a horizontally projecting ledge portion 30 that serves as a rest for a conventional refreshment tray T; and each has a recess 31 cut into it to receive a side wall 34 of the tray; and each has an over-hanging jaw 32 to engage over said side wall 34 to securely hold the tray.

The two front jaw members 26 are spaced far enough apart to engage and serve together as supports for a single tray T; and similarly the two rear jaw members are spaced far enough apart to engage and serve as supports for a single tray T.

The arcuate slots 28 in the jaw members permit of angular adjustment of the jaw members about their pivot pins 25 and 27 so that the trays can be adjusted to horizontal positions, bolts 35, which pass through the slots 28, and butterfly nuts 36 which thread on the bolts, serving to secure the jaw members in adjusted positions. The adjustability of the tray holding jaws makes it easy to serve refreshments in a drive-in theater because the trays can be adjusted to be horizontal despite the fact that the automobile is steeply inclined.

When the tray holder is not in use it can be folded up as shown in Fig. 7 by folding links 14 and 18. When so folded, it is compact and can readily be stored away.

A tray holder made according to this invention may be supplied by the proprietor of a roadside stand or of an open air theater to the automobilist, for temporary use, when the automobilist drives into such a place; or a holder and two trays may be made up as a set and sold to be kept permanently by an automobilist as part of the automobilist's picnic equipment. Picnic parties, fishermen, hunters, and other sportsmen will find such tray holders useful for lunching in an automobile. They also provide excellent support for tables or boards for use in playing games of cards, chess, checkers, etc., or for writing letters. When folded and packaged the two trays with the holder can be stored conveniently under the front seat of most cars.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A portable holder for trays and the like comprising a pair of parallelly-disposed, U-shaped straps engageable over the back of a seat with one leg of each strap depending in front of the seat and the other leg of each strap depending at the rear of the seat, a pair of links pivotally connected together at one end and each pivotally connected adjacent its other end to the front leg of a strap, a second pair of links pivotally connected together and each pivotally connected adjacent its other end to the rear leg of a strap, cooperating means carried by the front legs of the two straps for supporting a tray therefrom, and cooperating means carried by the rear legs of the two straps for supporting a tray therefrom.

2. A portable holder for trays and the like comprising a U-shaped frame engageable over the back of a seat with one leg of the frame depending in front of the seat and with the other leg of the frame depending at the back of the seat, a tray-supporting member secured to the front leg of the frame to project forwardly therefrom, and a tray-supporting member secured to the rear leg of the frame to project rearwardly therefrom, each supporting member having a ledge portion on which the bottom of a tray may rest, a recess for receiving the side wall of a tray and a jaw depending in front of said recess to engage the inside of said side wall and hold the tray on the member.

3. A portable holder for trays and the like comprising a U-shaped frame engageable over the back of a seat with one leg of the frame depending in front of the seat and with the other leg of the frame depending at the back of the seat, a tray-supporting member secured to the front leg of the frame to project forwardly therefrom, and a tray-supporting member secured to the rear leg of the frame to project rearwardly therefrom, each supporting member having a ledge portion on which the bottom of a tray may rest, a recess for receiving the side wall of a tray and a jaw depending in front of said recess to engage the inside of said side wall and hold the tray, each of said supporting members being pivotally adjustable on its supporting leg about a horizontally-disposed axis, and means for securing each supporting member in adjusted position.

4. A portable holder for trays and the like comprising a pair of parallelly-disposed U-shaped straps engageable over the back of a seat with one leg of each strap depending at the back of the seat, a pair of links pivotally connected together at one end and each pivotally connected adjacent its other end to the front leg of a strap, a second pair of links pivotally connected together at one end and each pivotally connected adjacent its other end to the rear leg of a strap, jaw members connected to the two front links to project forwardly, and jaw members connected to the two rear links to project rearwardly, each jaw member having a ledge portion on which the bottom of a tray may rest, a recess into which a side wall of the tray may be disposed, and a jaw depending in front of said recess and extending toward the ledge portion to engage in front of said tray side wall to hold a tray in the jaw.

5. A portable holder for trays and the like comprising two parallelly-disposed, identical, U-shaped straps engageable over the back of a seat with one leg of each strap depending in front of the back and the other leg of each strap depending at the rear of the back, the rear leg of each strap being shorter than the front leg, a pair of links pivotally connected together at one end and each pivotally connected adjacent its other end to the front leg of a strap, the latter end of each link being bent forwardly beyond the pivot point, a second pair of links pivotally connected together and each pivotally connected adjacent its other end to the rear leg of a strap, the latter end of each of the second pair of links being bent rearwardly beyond the pivot point, a tray-supporting member pivotally mounted on the forwardly projecting portion of each front link for adjustment about a horizontal axis, a tray-supporting member pivotally mounted on the rearwardly-projecting portion of each rear link for adjustment about a horizontal axis, each tray-supporting member having a ledge portion on which a tray may rest, a recess into which the side wall of a tray may be disposed, and a jaw depending in front of said recess and extending toward said ledge portion but spaced therefrom to retain a tray on the supporting member, and means securing each supporting member in any adjusted position.

WESLEY D. FINGER.

REFERENCES CITED

The following references are of record in the file of this patent:

UNITED STATES PATENTS

| Number | Name | Date |
| --- | --- | --- |
| 1,185,525 | Morris | May 30, 1916 |
| 1,921,462 | Graham | Aug. 8, 1933 |
| 2,503,602 | Titley | Apr. 11, 1950 |
| 2,510,646 | Meers | June 6, 1950 |

FOREIGN PATENTS

| Number | Country | Date |
| --- | --- | --- |
| 279,992 | Great Britain | Nov. 10, 1927 |
| 821,642 | France | Aug. 30, 1937 |